(12) United States Patent
Ramos et al.

(10) Patent No.: US 11,392,919 B2
(45) Date of Patent: *Jul. 19, 2022

(54) CREDIT DATA ANALYSIS

(71) Applicant: Capital One Services, LLC, McLean, VA (US)

(72) Inventors: Heather Ramos, Glen Allen, VA (US); Shankar Chithambarana, Henrico, VA (US); Mark Mendez, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/660,996

(22) Filed: Oct. 23, 2019

(65) Prior Publication Data

US 2020/0126055 A1 Apr. 23, 2020

Related U.S. Application Data

(63) Continuation of application No. 16/165,123, filed on Oct. 19, 2018, now Pat. No. 10,460,306.

(51) Int. Cl.
| | |
|---|---|
| *G06Q 40/00* | (2012.01) |
| *G06Q 20/24* | (2012.01) |
| *G06Q 30/02* | (2012.01) |
| *G06Q 20/08* | (2012.01) |

(52) U.S. Cl.
CPC ........... *G06Q 20/24* (2013.01); *G06Q 20/085* (2013.01); *G06Q 30/0215* (2013.01)

(58) Field of Classification Search
CPC ...... G06Q 40/00; G06Q 20/24; G06Q 20/085; G06Q 30/0215
See application file for complete search history.

(56) References Cited

U.S. PATENT DOCUMENTS

| | | |
|---|---|---|
| 6,957,192 B1 | 10/2005 | Peth |
| 7,092,905 B2 | 8/2006 | Behrenbrinker et al. |
| 8,285,600 B2 | 10/2012 | Mesaros |

(Continued)

OTHER PUBLICATIONS

[PDF] Mining massive fine-grained behavior data to improve predictive analytics. D Martens, F Provost, J Clark, EJ de Fortuny—MIS quarterly, 2016—stern.nyu.edu (Year: 2016).*

(Continued)

*Primary Examiner* — Lalita M Hamilton
(74) *Attorney, Agent, or Firm* — Harrity & Harrity, LLP

(57) ABSTRACT

A device may receive transaction data associated with a plurality of merchants. The transaction data may include a first set of transactions and, for each transaction included in the first set of transactions: data identifying a merchant and a method of payment. The device may identify, from the first set of transactions, a second set of transactions associated with a credit account method of payment from the first set of transactions. The device may train, based on the first set of transactions and the second set of transactions, a merchant model. The merchant model may be trained to: receive, as input, data identifying the merchant, and produce, as output, a measure of likelihood that the merchant accepts the credit account method of payment. The device may perform an action based on the merchant model.

20 Claims, 7 Drawing Sheets

(56) References Cited

U.S. PATENT DOCUMENTS

| | | |
|---|---|---|
| 9,092,767 B1 | 7/2015 | Andrews et al. |
| 10,460,306 B1 | 10/2019 | Ramos et al. |
| 2001/0016833 A1 | 8/2001 | Everling et al. |
| 2008/0033852 A1 | 2/2008 | Megdal et al. |
| 2008/0086365 A1 | 4/2008 | Zollino et al. |
| 2008/0228615 A1 | 9/2008 | Scipioni et al. |
| 2008/0228638 A1 | 9/2008 | Scipioni et al. |
| 2009/0006203 A1 | 1/2009 | Fordyce, III et al. |
| 2011/0022628 A1 | 1/2011 | Kramer et al. |
| 2012/0239479 A1 | 9/2012 | Amaro et al. |
| 2013/0138563 A1 | 5/2013 | Gilder et al. |
| 2013/0311375 A1 | 11/2013 | Priebatsch |
| 2016/0343051 A1 | 11/2016 | Hudson et al. |
| 2017/0053283 A1 | 2/2017 | Meng et al. |
| 2017/0243192 A1 | 8/2017 | Andrews et al. |
| 2018/0285900 A1 | 10/2018 | Bhattacharyya et al. |

OTHER PUBLICATIONS

Billpoint Sees an Opportunity As Rival PayPal Initiates FeesCostanzo, Chris. American Banker 166.51: 1. Source Media, Inc. Mar. 15, 2001, 8 pages.

IRS, "Internal Revenue Bulletin: 2004-31," https://www.irs.gov/irb/2004-31_IRB#d0e1647, August2, 2004, 89 pages.

Pofeldt E., "How to find a Business's Merchant Category Code," https://www.creditcards.com/credit-card-news/how-to-find-business-moc-code.php, Apr. 23, 2018, 7 pages.

Visa, "Supplier Locator," https://www.visa.com/supplierlocator-app/app/#/home/supplier-locator, Apr. 26, 2018, 1 page.

\* cited by examiner

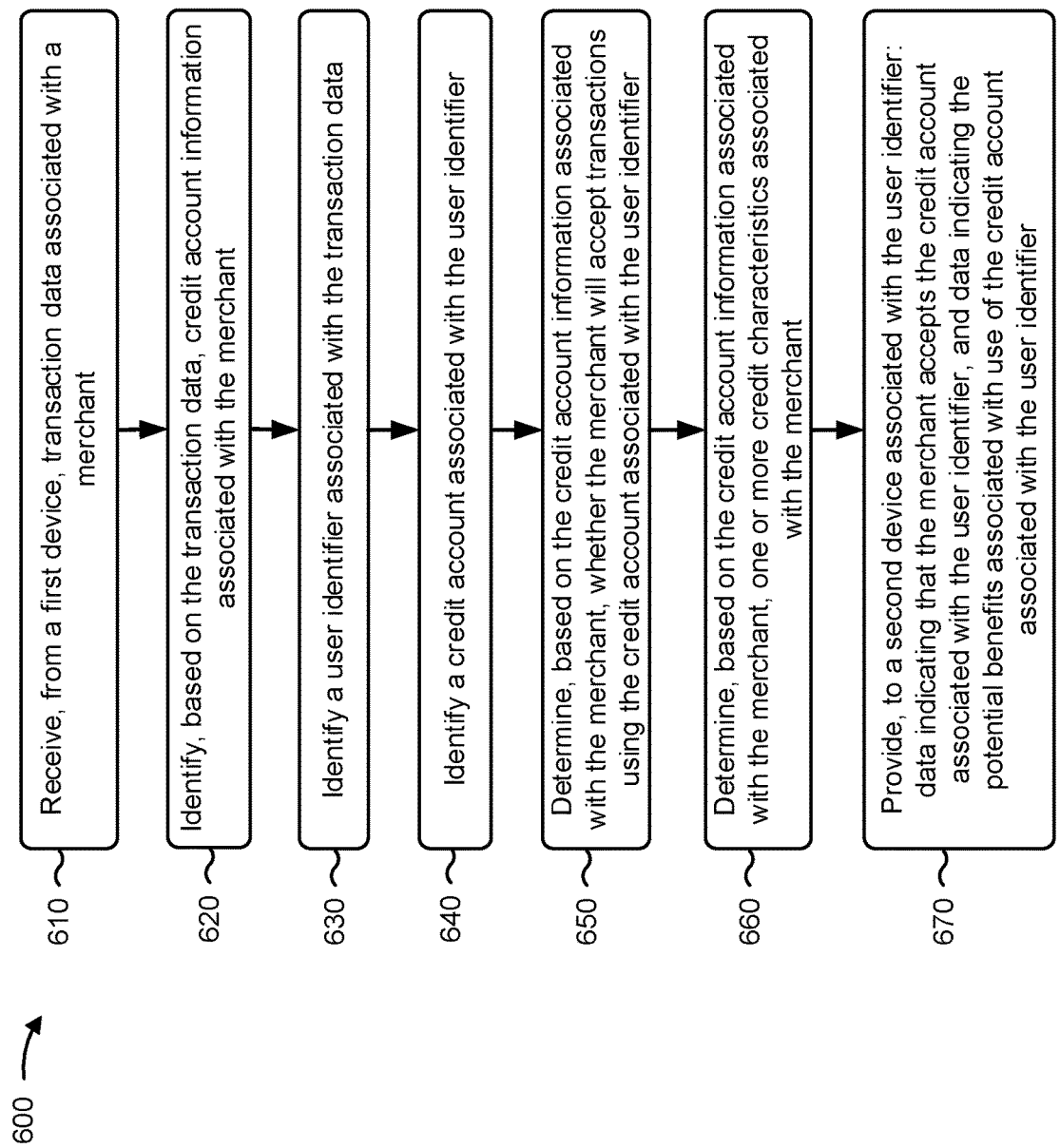

CREDIT DATA ANALYSIS

RELATED APPLICATION

This application is a continuation of U.S. patent application Ser. No. 16/165,123, filed Oct. 19, 2018 (now U.S. Pat. No. 10,460,306), which is incorporated herein by reference.

BACKGROUND

Merchants provide a variety of goods and/or services to a variety of entities (e.g., individuals, small businesses, large organizations, and/or the like) for purchase. When conducting a transaction with a merchant, it is often the merchant's choice to accept different forms of payment for the goods and/or services offered by the merchant.

SUMMARY

According to some implementations, a method may comprise: receiving, by a device, transaction data associated with a plurality of merchants, the transaction data including data specifying a first set of transactions and, for each transaction included in the first set of transactions: data identifying a merchant from the plurality of merchants, and a method of payment from a plurality of methods of payment; identifying, by the device and from the first set of transactions, a second set of transactions, each transaction included in the second set of transactions being associated with a credit account method of payment from the plurality of methods of payment; training, by the device and based on the first set of transactions and the second set of transactions, a merchant model, the merchant model being trained to: receive, as input, data identifying the merchant, and produce, as output, a measure of likelihood that the merchant accepts the credit account method of payment; and performing, by the device, an action based on the merchant model.

According to some implementations, a device may comprise: one or more memories; and one or more processors, communicatively coupled to the one or more memories, configured to: receive, from a user device, merchant query data, the merchant query data including information associated with a merchant; identify, based on the merchant query data, a merchant identifier uniquely identifying the merchant; provide the merchant identifier to a merchant model, the merchant model having been trained to receive, as input, the merchant identifier, and the merchant model having been trained to produce, as output, a measure of likelihood that the merchant identified by the merchant identifier will accept a credit account method of payment; and perform an action based on the output of the merchant model.

According to some implementations, a non-transitory computer-readable medium may store instructions, the instructions comprising: one or more instructions that, when executed by one or more processors, cause the one or more processors to: receive, from a first device, transaction data associated with a merchant; identify, based on the transaction data, credit account information associated with the merchant; identify a user identifier associated with the transaction data; identify a credit account associated with the user identifier; determine, based on the credit account information associated with the merchant, whether the merchant will accept transactions using the credit account associated with the user identifier; determine, based on the credit account information associated with the merchant, one or more credit characteristics associated with the merchant; determine, based on the credit account associated with the user identifier and the one or more credit characteristics associated with the merchant, potential benefits associated with use of the credit account associated with the user identifier; and provide, to a second device associated with the user identifier: data indicating that the merchant accepts the credit account associated with the user identifier, and data indicating the potential benefits associated with use of the credit account associated with the user identifier.

BRIEF DESCRIPTION OF THE DRAWINGS

FIGS. 4-6 are flow charts of example processes for credit account analysis and recommendations.

DETAILED DESCRIPTION

Figure 1A:
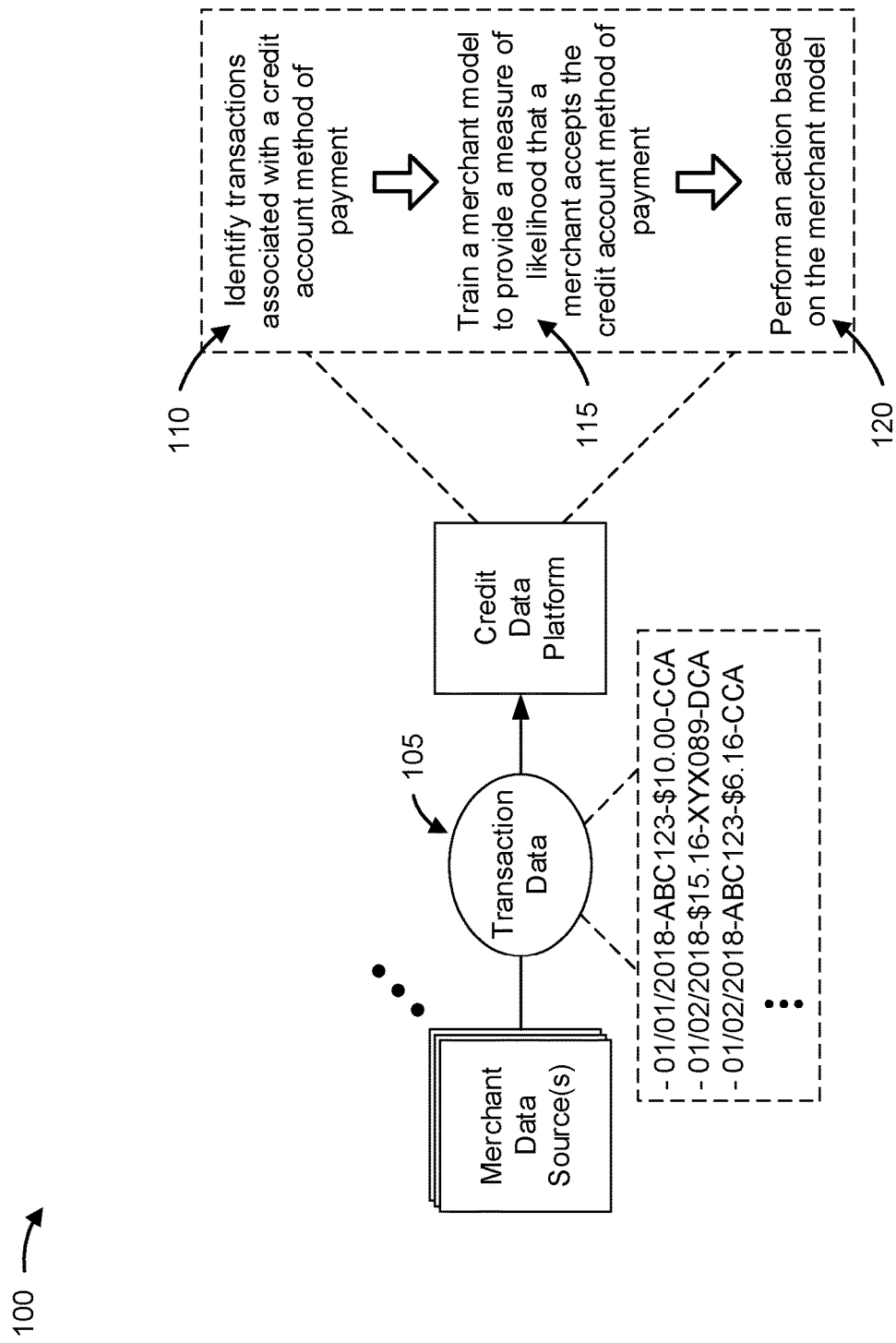
FIGS. 1A and 1B are diagrams of example implementations described herein.

The following detailed description of example implementations refers to the accompanying drawings. The same reference numbers in different drawings may identify the same or similar elements.

While merchants are able to accept a variety of forms of payment for providing goods and services, the purchasers of goods and services are not always aware of the forms of payment offered by merchants, or the details and potential restrictions of different forms of payments offered by a particular merchant. Additionally, merchants are not always aware of the potential opportunities that might be lost by not enabling customers to make purchases with different forms of payments.

Some implementations, described herein, provide a credit data platform that is capable of determining whether a merchant accepts credit account payments (e.g., payments made via credit card). By determining whether the merchant accepts credit account payments, the credit data platform may provide users (e.g., individuals who make purchases from the merchant) with information that may enable the users to pay for goods or services with additional account types that might provide benefits to the user. In some implementations, the credit data platform may also provide merchants that do not accept credit account payments with information indicating potential benefits of accepting credit account payments. For example, the credit data platform may use transaction data received from merchants or other sources of transaction information to build a merchant model (e.g., a machine learning model) capable of providing an indication of whether or not a merchant accepts credit account methods of payment. The model may also provide, for a merchant, credit characteristics (e.g., which credit brands are accepted, credit minimum and/or maximum limits, fees for using credit accounts, and/or the like). Based on the merchant model, the credit data platform may determine, based on a user query, whether a merchant included in the query takes credit account payments, identify similar merchants that do accept credit account payments, and provide users with information identifying merchants that accept credit account payments, enabling users to pay merchants with payment options the users might not otherwise have used. In some implementations, the credit data platform may also notify merchants regarding the potential opportunities available by accepting credit account payments. Other actions, described in further detail below, may also be performed by the credit data platform in a manner designed to provide merchants and customers of the merchants with additional options for conducting transactions.

In this way, the credit data platform may analyze information regarding transactions with merchants to provide users and/or merchants with information relevant to credit account acceptance. For example, users may be provided with information that enables the users to use credit accounts with one or more merchants, providing the users with additional payment options, opportunities for rewards, and/or the like. Merchants may be provided with information that enables the merchants to determine demand for accepting credit account payments and provide additional payment options to the merchants' customers. In some implementations, the credit data platform may handle thousands, millions, billions, and/or the like, of data records regarding merchant transactions and/or other relevant credit account data within a period of time (e.g., daily, weekly, monthly), and thus may provide big data capability. The big data handled by the credit data platform may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for credit account analysis and recommendations conserves computing resources (e.g., processor resources, memory resources, and/or the like) and time that would otherwise be wasted by using manual processes for attempting to analyze credit account and transaction information, and developing and providing recommendations based on the analysis.

Figure 1B:
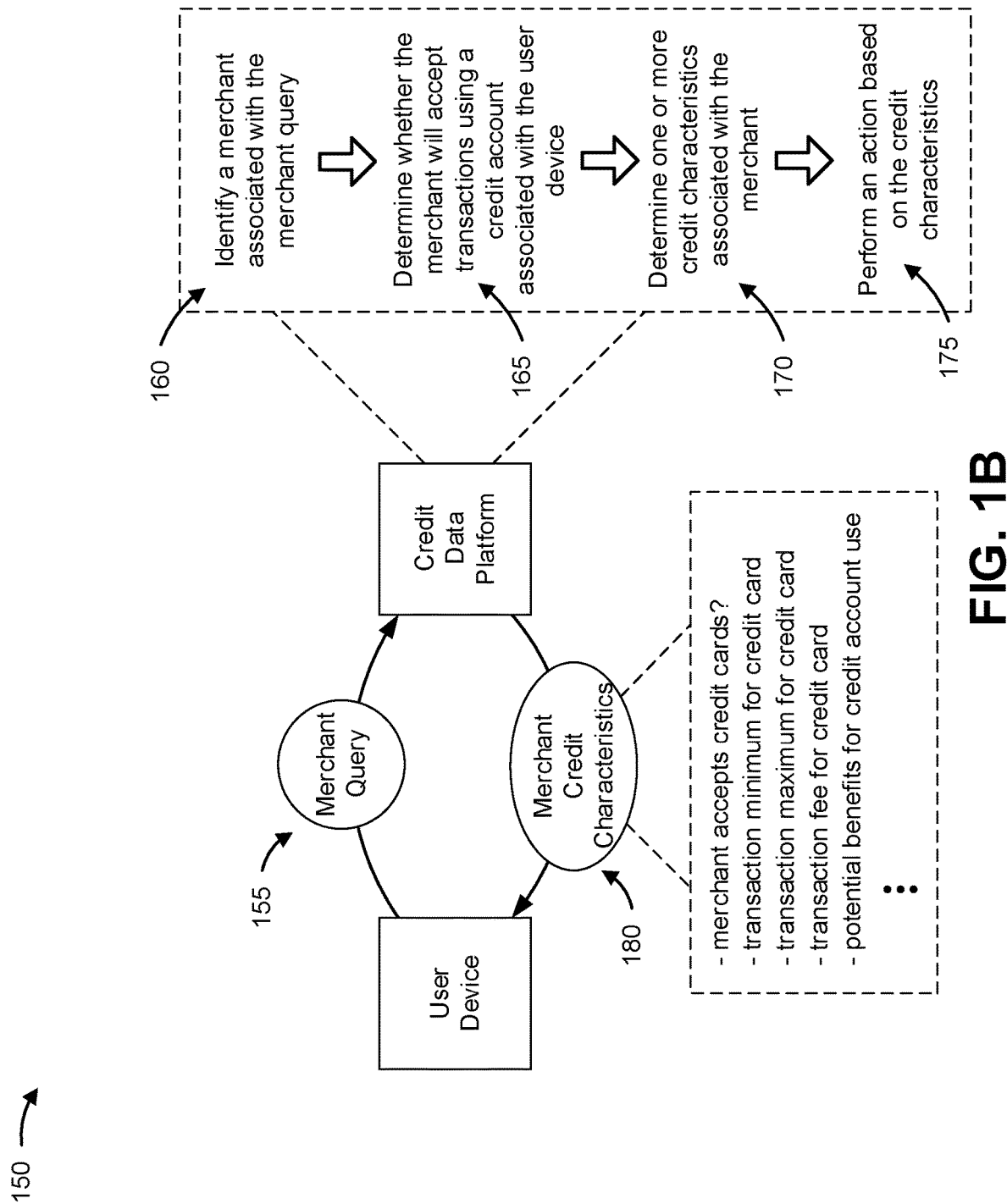

FIGS. 1A-1B are diagrams of example implementations described herein. As shown in FIG. 1A, example implementation 100 includes merchant data sources (e.g., server computers, data storage devices, website servers, and/or the like) that store and/or provide information associated with merchants, and a credit data platform (e.g., a server computer, a cloud computing platform, and/or the like). While the devices of implementation 100 are depicted separately, in some implementations, the functionality of one or more of the devices of implementation 100 may be included in another device, or may be included in multiple, distributed devices. The example implementation 100 depicts the acquisition of information regarding one or more merchants, including transaction data, and the training of a machine learning model based on the information.

As shown by reference number 105, the credit data platform receives transaction data from the merchant data sources. The merchant data sources may include a variety of devices that are capable of providing, to the credit data platform, information regarding transactions associated with one or more merchants. For example, merchant data sources may include devices associated with merchants (e.g., point-of-sale terminals, server devices that store transaction information, and/or the like), user devices that are used to conduct transactions with merchants (e.g., mobile devices, personal computers, tablet computers, and/or the like) and that may include software for providing transaction information to the credit data platform, credit account organization devices (e.g., devices associated with credit card companies, banking organizations, and/or the like) that may store and/or provide information regarding transactions associated with various types of payment accounts, accounting devices (e.g., personal computers, server computers, and/or the like) which may be used by individuals and/or organizations for storing records of transactions with merchants, and/or other types of devices that may include or otherwise have access to information regarding transactions conducted with merchants. The transaction data may include a variety of information regarding transactions conducted with one or more merchants, such as strings of characters associated with bank card statements, credit card statements, and/or the like.

By way of example, the transaction data included in the example implementation 100 includes memo strings that may be included, for example, in a user's account statements and/or transaction records, which the user has opted to provide to the credit data platform. The example memo strings include data specifying a date associated with a transaction, a merchant associated with the transaction, a transaction amount, and a type of transaction (e.g., debit card purchase, check purchase, credit card purchase, and/or the like). For example, the example string, "Jan. 1, 2018-ABC123-$10.00-CCA," may indicate a $10.00 credit card account purchase made from a merchant identified as "ABC123" on the date, Jan. 1, 2018. The example string, "Jan. 1, 2018-$15.16-XYX089-DCA," may indicate a $15.16 debit card account purchase made from a merchant identified as "XYZ089" on the date, Jan. 1, 2018. The example string, "Jan. 1, 2018-ABC123-$6.16-CCA," may indicate a $6.16 credit card account purchase made from the merchant identified as "ABC123" on the date, Jan. 1, 2018. The user may have voluntarily provided the transaction information through a device (e.g., a mobile device) operating an application designed to communicate transaction data to the credit data platform.

Additionally, or alternatively, the transaction data may include other information associated with one or more transactions with one or more merchants. For example, transaction data may include a specific time associated with a transaction, products or services purchased, account identifiers and/or account numbers associated with payment accounts used for the transaction, a credit brand (e.g., VISA®, Mastercard®, American Express®, and/or the like) associated with the credit account used for the transaction, data identifying the user associated with the credit account, data identifying an address associated with the merchant, and/or the like. In some implementations, transaction data received by the credit data platform may be at least partially redacted. For example, some information included in the transaction data may be redacted in a manner designed to provide privacy to a user and/or merchant associated with a transaction, such as data identifying products or services purchased, data identifying the user, and/or the like.

In some implementations, the format of the transaction data received by the credit data platform may vary. For example, the strings of data may specify information regarding a transaction in a different order, some strings of data may include more data than others, some transaction data may be provided as a list of comma separated values, some transaction data may be provided in a format associated with accounting software, some transaction data may be streamed in parts, some transaction data may be provided in narrative form, and/or the like. The credit data platform is capable of parsing various types of transaction data to obtain useable transaction data that can be used for training a machine learning model. For example, the credit data platform may use a variety of techniques to obtain useable transaction data, including parsing data using one or more regular expressions, obtaining the meaning of transaction data using one or more natural language processing techniques, and/or the like.

In some implementations, the credit data platform may cleanse the transaction data. Data cleansing may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any merchant related to that address). The data cleansing method may also involve activities, such as harmonization of data (e.g., harmonization of short codes (e.g., St., Rd., and/or the like) to actual words (e.g., street, road, and/or the like).

In this way, the credit data platform may obtain information designed to enable the credit data platform to analyze information (e.g., transaction data) related to transactions associated with various merchants. The ability to analyze information related to transactions associated with various merchants may enable the credit data platform to perform a variety of actions based on the analysis.

In some implementations, the credit data platform may provide at least a portion of the transaction data to another device for analysis and/or enrichment, in a manner designed to obtain transaction data that can be used when training a merchant model to determine whether a merchant accepts a credit account method of payment. For example, the identity of a merchant may be obtained by providing a string of transaction data, or a portion of the transaction data, to a merchant identifying device designed to identify a merchant that might be identifiable from different strings or types of data. For example, a merchant may be identified based on a string included in transaction data, an address, a phone number, a merchant name, and/or the like; a merchant identifying device may use some or all of the foregoing data (or other data) to identify a particular merchant (e.g., by a unique merchant identifier). Similarly, a credit brand identifying device may be able to provide information identifying which credit brand is associated with a transaction (e.g., based on transaction data identifying a brand, account number, credit card processor, and/or the like). In some implementations, aforementioned devices may be implemented in the same system as the credit data platform (e.g., in a distributed computing system, cloud computing platform, and/or the like), enabling the credit data platform to obtain information uniquely identifying merchants within transaction data, credit brands associated with transactions, and/or the like.

As shown by reference number 110, the credit data platform may identify transactions associated with a credit account method of payment. For example, the transaction data may include data distinguishing transactions that were paid for using a credit account method of payment from other forms of payment (e.g., cash, check, debit card account, merchant credit, and/or the like). In the example transaction data above, the transaction data included data identifying the type of payment account used (e.g., CCA for credit card account and DCA for debit card account). In some implementations, the transaction data may be associated with information designed to indicate that the transaction data is associated with a credit account method of payment. For example, in some situations, the transaction data may be provided to the credit data platform by a particular type of device and/or software designed to provide transaction data for only transactions that were paid for using credit accounts (e.g., an application operating on a user device and specifically designed to provide transaction data to the credit data platform only in situations where a credit account method of payment was used).

By identifying transactions associated with a credit account method of payment, the credit data platform may distinguish transactions by those that were paid for with a credit account, and those that were paid for using another method of payment. The ability to identify transactions associated with the credit account method of payment may facilitate the training of a merchant model to determine, among other things, whether a given merchant accepts the credit account method of payment.

As shown by reference number 115, the credit data platform trains a merchant model to provide a measure of likelihood that a merchant accepts the credit account method of payment. The merchant model is a machine learning model trained by the credit data platform to, in this example, produce output indicating a measure of likelihood that a merchant accepts the credit account method of payment, given a particular input. When using machine learning, a machine learning model may be trained to receive, as input, a variety of features associated with merchants and transaction data. A feature may be a measurable property or characteristic that may be used for training a machine learning model, such as a property relating to a particular individual or demographic of individuals, a property associated with aggregating a particular type of information, a property identifying a benchmark for a particular individual or class of individuals, a property capable of being used as a signal of interest for a particular good or service, and/or the like. In some cases, a feature may relate to a browsing behavior, an affinity, an interest, a life event, a keyword, a URL, a viewed webpage, a clicked or selected button, a type of content, a device used at a particular time period, and/or the like. Machine learning features may be determined using a feature identification technique, such as text mining and latent semantic analysis (LSA), a trend variable analysis, an interest diversity analysis, a neural network, a composite indicators analysis, a clustering analysis, and/or the like. Using one or more feature selection techniques, the credit data platform may select the features to be used by a machine learning model. The resulting model may receive features (e.g., transaction data) as input and produce, as output, data indicating a measure of likelihood that a particular merchant accepts the credit account method of payment. In some implementations, the resulting model may provide additional information as output, which may be used by the credit data platform for performing a variety of actions.

Some example features used to train the merchant model may include a ratio of credit account payments to payments made via other payment methods (where a low ratio may indicate that use of credit account payments is an exception, rather than a method of payment typically accepted by a merchant), and/or dates associated with transactions (e.g., where more recent transactions may be weighed more heavily than older transactions). In some implementations, information regarding whether a merchant accepts the credit account method of payment may come from a third party source of information, which may also be used as a feature in training the merchant model. For example, a user review on a web site associated with the merchant may indicate that the merchant accepts credit cards, a credit brand website may provide information indicating which merchants accept credit cards associated with the credit brand, a merchant may provide (e.g., on a merchant website) information indicating whether the merchant accepts credit cards. Each of the foregoing, if available, may be used as a feature for input to the merchant model.

Using the foregoing features, the credit data platform may train the merchant model to provide, as output, data indicating a measure of likelihood that a merchant will accept the credit account method of payment. In some implementations, the merchant model may be trained using one or more supervised machine learning techniques. Training data may be obtained from previous applications of the merchant model that are annotated by a user with data indicating whether the output of the merchant model correctly identified whether a merchant accepts the credit account method of payment.

In some implementations, the credit data platform may train the merchant model using one or more subsets of features (e.g., features identified and selected based on feature identification and selection techniques described above). Additionally, the credit data platform may train the merchant model using a supervised training technique, an unsupervised training technique, a classification-based training technique, a logistical regression-based training technique, a Naïve Bayesian classifier technique, a support vector machine (SVM) training technique, a neural network, and/or the like. In this case, the merchant model may be trained to output a value indicating a measure of confidence that a merchant accepts the credit account method of payment.

In some implementations, the credit data platform may receive the merchant model after the merchant model has been trained. For example, a device other than the credit data platform may train the merchant model and may provide the merchant model to the credit data platform. In some cases, the device other than the credit data platform may train a portion of the merchant model, and the credit data platform may train the remainder of the merchant model.

In some implementations, the credit data platform may train the merchant model, and/or one or more separate machine learning models, to produce output indicating a variety of information regarding a merchant. For example, a merchant may be associated with one or more credit characteristics. Credit characteristics may include, for example, whether the merchant accepts the credit account method of payment, which credit brand or credit brands the merchant accepts, whether the merchant has a minimum and/or maximum purchase amount for use of a credit payment account, what the minimum and/or maximum transaction amount is (if applicable), whether the merchant charges a transaction fee or fees for use of a credit payment account, what the merchant charges for the transaction fee or fees (if applicable), whether the merchant permits the credit account method of payment for certain goods and/or services and not for other goods and/or services, and/or the like.

As noted above, in some implementations, the credit data platform may train the merchant model to produce, as output, at least one of the foregoing credit characteristics. In some implementations, the credit data platform may train multiple machine learning models (e.g., a separate machine learning model for each credit characteristic) that may be used to determine credit characteristics. The credit data platform may identify features for and train additional machine learning models in the same or a similar manner as that described above for training the merchant model. The features used and/or machine learning methods used may vary from one model to another.

By way of example, the credit data platform may train the merchant model (e.g., to determine whether a merchant accepts the credit account method of payment) using the logistic regression technique and may use the SVM training technique to train a model to determine which credit brand or credit brands are accepted by the merchant. The credit data platform may use the decision tree technique to train a model to determine whether the merchant has a minimum and/or maximum transaction amount and may use linear regression to determine the minimum and/or maximum transaction amount. In this way, the credit data platform may not only produce a merchant model designed to determine a measure of likelihood that a merchant will accept a credit account method of payment but may also produce one or more other models designed to provide a variety of credit characteristics regarding the merchant. The ability to train one or more models to determine various credit characteristics associated with the merchant enables the credit data platform to perform a variety of actions based on the trained model(s).

As shown by reference number 120, the credit data platform performs an action based on the merchant model. In some implementations, the credit data platform may perform a variety of actions based on one or more models, including the merchant model. For example, the credit data platform may perform one or more actions based on the credit characteristics produced as a result of using the merchant model and/or other models for a particular merchant. When performing one or more actions, the credit data platform may access user account information associated with a user (e.g., the user of a user device in communication with the credit data platform) and/or merchant account information associated with the particular merchant. In some implementations, the credit data platform may access and/or use the user account information and/or merchant account information only in the manner permitted by the corresponding user and/or merchant, enabling users and merchants to remain privacy conscious while still obtaining the benefits of the credit account platform. Some of the possible actions that may be performed by the credit data platform (e.g., alone or in combination with any of the other actions) are described in further detail below.

In some implementations, the credit data platform may store one or more credit characteristics in a manner designed to associate a merchant with the credit characteristics determined as a result of the use of the merchant model and/or other models. For example, the credit data platform may store, in a data structure such as a database, data associated the merchant (e.g., identified by a unique merchant identifier) with data indicating the measure of likelihood that the merchant accepts the credit account method of payment, data indicating which credit brand or credit brands the merchant accepts, data indicating whether the merchant has a minimum and/or maximum purchase amount for use of a credit payment account, data indicating what the minimum and/or maximum transaction amount is (if applicable), data indicating whether the merchant charges a transaction fee or fees for use of a credit payment account, data indicating what the merchant charges for the transaction fee or fees (if applicable), whether the merchant permits the credit account method of payment for certain goods and/or services and not for other goods and/or services, along with the identity of the certain goods and/or services, and/or the like. In some implementations, the credit characteristics associated with the merchant may be stored in a manner designed to be queried (e.g., by a user device) and/or searched, enabling a user to search for, and the credit data platform to retrieve, credit characteristics corresponding to the merchant associated with the query or search. In some implementations, the credit data platform may also store data associating the merchant with a particular category of merchants, one or more products (e.g., products sold by the merchant), one or more services (e.g., services provided by the merchant), and/or the like. In this situation, the merchant may be searched for, not only by data identifying the merchant (e.g., the merchant's unique identifier), but also by a search query for merchants in a similar category as the merchant, a search query for particular goods and/or services offered by the merchant, and/or the like.

In some implementations, the credit data platform may use the credit characteristics obtained from the merchant model, or other models, to perform a variety of actions on behalf of a user (e.g., a user that has opted in to receive recommendations, suggestions, and/or the like, based on information associated with the user) that is identified as relevant to the merchant. For example, the credit data platform may access information associated with a user account that indicates that the user has previously conducted transactions with the merchant or a similar merchant (e.g., the similar merchant being in the same category as and/or offering products and/or services similar to those offered by the merchant). In a situation where the merchant accepts the credit account method of payment, the credit data platform may provide, to the user device associated with the user, data indicating that the merchant accepts the credit account method of payment. This information indicating that the merchant accepts the credit account method of payment may be useful, for example, in a situation where the user previously conducted transactions with the merchant using a payment method other than a credit account, and where use of a credit account may be desirable or otherwise beneficial to the user. For example, the user may have been unaware that the merchant accepts the credit account method of payment. The credit data platform, having information indicating that the user has a credit account (e.g., based on information received from a user device associated with a user, including transaction data, an order history, and/or the like), may suggest to the user that the user's credit account may be used to pay for transactions with the merchant (e.g., to enable the user to benefit by having beneficial payment terms, obtaining rewards for using the credit account, and/or the like). The foregoing may be beneficial to the user, for example, in a situation where a user frequently orders goods and/or services from the merchant, but does not have information regarding the types of payment accounts accepted by the merchant (e.g., in a situation where the user is an owner of a business and conducts transactions with the merchant via telephone).

In some implementations, the credit data platform may provide the user device with additional information regarding the credit characteristics of a particular merchant. For example, the credit data platform may provide the user device with data indicating which credit brands are accepted by the merchant, whether the merchant has any minimum or maximum limits for credit account transactions (and what the limits are), whether the merchant has any fees for use of the credit account method of payment (and what the fees are), and/or the like. In some implementations, measures of likelihood associated with the credit characteristics (e.g., the confidence that the merchant model and/or other models has in the model output) may also be provided to the user device (e.g., providing the user with awareness that the credit characteristics are predictions, rather than absolute certainty).

In some implementations, the credit data platform may access, for a user account, information identifying potential benefits associated with use of a credit account method of payment. For example, a particular user may have a credit card that earns rewards. In a situation where the credit data platform has determined that a merchant accepts credit cards and is relevant to the user associated with the user account (e.g., based on prior transactions associated with the user and the merchant), the credit data platform may provide the user device associated with the user account with information indicating the potential benefits associated with using the credit account method of payment. For example, the credit data platform may provide the user device with data indicating the payment terms of the credit account, data indicating the potential rewards that could be earned, and/or the like. In some implementations, the credit data platform may calculate projected rewards for a user based on the user of the credit account. For example, based on the transaction amounts associated with previous transactions between the user and the merchant (or a similar merchant), the credit data platform may determine the rewards that would have been earned by using the credit account in the previous transactions, and/or calculate rewards that might be earned in the future by using the credit account for similar transactions.

In some implementations, a user account may be associated with multiple credit accounts. In this situation, the credit data platform may identify potential benefits for each of the credit accounts and provide data identifying the potential benefits to the user device associated with the user. In some implementations, the credit data platform may rank the potential benefits (e.g., based on predetermined criteria and/or user settings), enabling the credit data platform to provide a recommendation to the user regarding which credit account might be preferred, or most beneficial, for use with the merchant. In some implementations, the credit data platform may communicate with a rewards device, or rewards service, to facilitate providing a recommendation to the user. For example, in some implementations, a dedicated device may be used to determine which rewards are preferred for a user, and the credit data platform may communicate with the dedicated device to facilitate making a recommendation regarding the potential benefits of using one or more credit accounts for transactions with the merchant.

In some implementations, the credit data platform may determine that, while the merchant accepts the credit account method of payment, a user does not have a credit account method of payment, or does not have a credit account method of payment accepted by the merchant (e.g., the merchant accepts a different credit brand). In this situation, the credit data platform may provide, to a user device associated with the user, data recommending a particular credit account that might be beneficial to use when conducting transactions with the merchant (e.g., based on the merchant being likely to accept the particular credit account). In some implementations, based on user account information available to the credit data platform, the credit data platform may automatically fill in a portion or all of a credit account application for the user, and/or may automatically submit the credit account application for the user (e.g., based on user settings instructing the credit data platform to facilitate the user with credit account applications).

In some implementations, in a situation where the merchant does not accept the credit account method of payment, or the merchant does not accept a credit brand with which the user already has a credit account, the credit data platform may provide, to a user device associated with the user, data recommending another merchant that does accept the credit account method of payment and/or the credit brand. The other merchant may be identified, for example, based on data identifying a category associated with the merchant and the other merchant (e.g., both merchants may belong to the same category), data identifying the products and/or services offered by the other merchant (e.g., the products and/or services offered by the other merchant may match, or at least partially match, the products and/or services offered by the merchant), and/or the like, which may be stored by the credit data platform. In this situation, the credit data platform may provide the user with a recommendation that might enable the user to use the credit account payment method, and obtain benefits for using the credit account payment method, by switching the merchant used by the user for at least some products and/or services.

The credit data platform may, in some implementations, analyze a user account to determine, for a user associated with the user account, which merchants the user may benefit from conducting transactions with, and which credit accounts may be beneficial to use in conducting the transactions with the merchants. For example, the credit data platform may determine, for the merchants that the user conducts transactions with (e.g., based on transaction history associated with the user), which merchants accept the credit account method of payment and other credit characteristics (e.g., credit brands accepted, minimum and/or maximum limits, fees, and/or the like) to match the user's credit accounts with merchants based on the credit characteristics, and/or to recommend other merchants based on the credit characteristics. For example, the credit data platform may recommend that a user use a first credit card for transactions with one merchant (e.g., based on the rewards provided by the credit card and merchant not charging transaction fees for the first credit card), and a second credit card for transactions with another merchant (e.g., a new merchant that the user has not conducted transactions with before, based on a previous merchant not accepting a credit card associated with the user account, and based on the new merchant accepting the second credit card).

In some implementations, the credit data platform may enable automatic payments based on recommendations provided by the credit data platform. For example, in a situation where a user account is associated with a user device that operates an application associated with the credit data platform, the credit data platform may provide instructions to the application, the instructions causing application to assign bills associated with particular merchants to be automatically paid by particular credit accounts associated with the user. In this situation, the recommended automatic payments may be provided to the user device as a recommendation for the user, and the user may opt to accept the recommendation, in whole or in part, to change the payment accounts used for paying various merchants with whom the user conducts transactions. In some implementations, the credit data platform may automatically order, or re-order goods and/or services from the merchant based on the recommendation(s). For example, in a situation where the user has enabled the credit data platform to automatically make purchases, the credit data platform may identify a recommended credit account to use when ordering a particular product or service (e.g., previously identified as a recurring product or service purchase) and automatically submit a purchase order on behalf of the user, using the recommended credit account.

In some implementations, the credit data platform may determine that a particular merchant does not accept a credit account method of payment, and/or that the particular merchant only accepts a particular credit brand, has minimum and/or maximum transaction limits for credit account payments, and/or has fees for credit account payments. In this situation, the credit data platform may provide a user device, associated with the merchant, with information indicating one or more options the merchant may use to be able to accept the credit account method of payment (and/or to accept additional credit brands, reduce or eliminate a minimum transaction limit, increase or eliminate a maximum transaction limit, reduce fees, and/or the like). For example, the credit data platform may provide the user device with information indicating a product and/or service that the merchant may use to accept the credit card method of payment.

In some implementations, the credit data platform may provide, to a user device associated with the merchant, information indicating that at least one user searched for information regarding whether the merchant accepts the credit account method of payment. Providing the foregoing information to the merchant may enable the merchant to assess potential demand for the acceptance of the credit account method of payment. In some implementations, the credit data platform may provide, to the user device associated with the merchant, information identifying potential business that might be gained by accepting the credit account method of payment. For example, the merchant may be able to assess demand for acceptance of the credit card method of payment from data provided by the credit data platform that indicates which merchants in the same category as the merchant accept the credit account method of payment (e.g., enabling the merchant to identify an opportunity to gain business by offering a new method of payment for potential customers). In some implementations, the credit data platform may determine a measure of demand for acceptance of the credit account method of payment and provide the measure of demand to the user device associated with the merchant. For example, the measure of demand may be determined based on the transaction amounts associated with transactions conducted between users and merchants in the same category as the merchant, where the transactions were paid for using a credit account.

In some implementations, the credit data platform may provide a search service that enables a user device to query the credit data platform for credit characteristics associated with merchants. For example, in a situation where the credit data platform stores credit characteristics in a database, and associates the credit characteristics with merchants, the credit data platform may provide the ability to query the database, and/or provide a web interface for searching the database (e.g., in indexed form) for information regarding the credit characteristics associated with one or more merchants. For example, a user may query for credit characteristics associated with a particular merchant, a particular category of merchants, merchants that sell a particular good and/or service, and/or the like. Additional information regarding the ability to query the credit data platform is provided below, with respect to FIG. 1B.

As noted above, the credit data platform may perform any combination of the foregoing actions, or other actions, based on the merchant model and/or additional models that might be trained by the credit data platform. The actions performed by the credit data platform may facilitate a wide variety of benefits for both merchants and the users who conduct business with merchants.

As shown in FIG. 1B, example implementation 150 includes a user device, (e.g., personal computer, tablet computer, mobile device, and/or the like), and the credit data platform (e.g., the same as or similar to the credit data platform described above with reference to FIG. 1A). While the devices of implementation 150 are depicted separately, in some implementations, the functionality of one or more of the devices of implementation 150 may be included in another device, or may be included in multiple, distributed devices. The example implementation 150 depicts querying for information regarding one or more merchants and providing merchant credit characteristics in response to the query.

As shown by reference number 155, the credit data platform receives merchant query from the user device. For example, the user device may provide the merchant query in a variety of ways, such as through a web interface provided by the credit data platform as a website, through an application operating on the user device (e.g., an application associated with the credit data platform), and/or the like. The merchant query may include any information that enables the credit data platform to identify a merchant, merchant category, product, and/or service, and may include a database query, a search engine query, transaction data, and/or the like.

By way of example, the merchant query may include a database query for credit characteristics associated with a particular merchant identified by the merchant query. As another example the merchant query may be a natural language query submitted via a website for "merchants associated with office furniture" (e.g., a particular category of merchant). As yet another example, the merchant query may include transaction data, such as a string for a transaction, the string including data identifying a merchant associated with a particular transaction. The credit data platform may use the merchant query to obtain credit characteristics associated with one or more merchants that are associated with the merchant query.

As shown by reference number 160, the credit data platform may identify a merchant associated with the merchant query. In some implementations, the merchant query specifies a merchant, merchant category, product, and/or service, which is associated with one or more merchants in a database. In this situation, the credit data platform may identify the merchant based on comparing the information associated with the merchant, in the database, with the information specified in the merchant query. In some implementations, the merchant query may include information used to uniquely identify a particular merchant, such as a merchant identifier, or specific information included in a search query or transaction data, from which a unique merchant identifier may be obtained.

In some implementations, the credit data platform may include or otherwise be in communication with a device capable of uniquely identifying a merchant from a variety of information, such as the information included in the search query or transaction data (e.g., included in the merchant query). In this situation the credit data platform may obtain a unique merchant identifier, enabling the credit data platform to access credit characteristics regarding the corresponding merchant from the database. In some implementations, the credit data platform may generate regular expressions for identifying the merchant associated with transaction data (e.g., in a situation where the merchant query includes transaction data). For example, the credit data platform may determine, based on previous transaction data associated with a particular merchant, that the portion of transaction data that identifies the particular merchant matches a particular pattern (or multiple patterns). In this situation, the credit data platform may generate a regular expression that may be applied to transaction data to determine when the transaction data includes a string that matches the particular pattern associated with the regular expression; based on the transaction data matching the regular expression, the credit data platform may identify the particular merchant as the merchant associated with the merchant query.

In some implementations, the credit data platform may identify multiple merchants associated with the merchant query. For example, in a situation where the merchant query is associated with a merchant category, product, and/or service, the credit data platform may identify multiple merchants in the same merchant category, and/or identify multiple merchants that offer the same products and/or services.

As shown by reference number 165, the credit data platform determines whether the merchant will accept transactions using a credit account associated with the user device. In this situation, the credit data platform has access to user account information associated with the user device, and the user account information may identify a credit account associated with the user account. After identifying the merchant associated with the query, the credit data platform may obtain credit characteristics (e.g., from the database) for the merchant, and use the credit characteristics to determine whether the merchant accepts the credit account associated with the user. For example, the credit characteristics may include a characteristic specifying whether the merchant accepts the credit account method of payment that is associated with the credit account associated with the user account. After determining whether the merchant will accept the credit account associated with the user account, the credit data platform may determine a variety of other information that might be useful for providing a recommendation to the user device, or for performing another action.

As shown by reference number 170, the credit data platform may determine one or more credit characteristics associated with the merchant. For example, in addition to determining whether the merchant accepts transactions using the credit account associated with the user device, the credit data platform may determine whether the merchant accepts any other type of credit account, whether the merchant has minimum and/or maximum limits for transactions associated with the credit account associated with the user device, whether the merchant charges any fees for transactions associated with the credit account associated with the user device, whether the merchant permits the credit account method of payment for certain goods and/or services and not for other goods and/or services, along with the identity of the certain goods and/or services, and/or the like.

As shown by reference number 175, the credit data platform may perform an action based on the credit characteristics. For example, the credit data platform may perform any combination of the actions described above as being performed by the credit data platform, e.g., with respect to FIG. 1A. By way of example, the credit data platform may provide one or more recommendations to the user device (e.g., associated with a user account), provide the user device with information regarding potential benefits associated with using the credit account associated with the user device, automatically apply for a credit account that is accepted by the merchant queries, provide the user device with information identifying multiple merchants that accept the credit account associated with the user device, provide one or more recommendations to a user device associated with the merchant (e.g., the merchant identified by the merchant query), and/or the like.

As shown by reference number 180, the credit data platform provides the user device with merchant credit characteristics. For example, the merchant credit characteristics provided to the user device may provide information regarding the merchant associated with the merchant query. The example merchant credit characteristics include information indicating whether the merchant accepts credit cards, information indicating the transaction minimum for a credit card purchase, the transaction maximum for a credit card purchase, a transaction fee for a credit card purchase, and potential benefits (e.g., credit account terms, rewards, and/or the like) for using the credit account associated with the user device. Additionally, or alternatively, the credit data platform may perform any of the actions described above with reference to FIG. 1A, and/or other actions.

In this way, the credit data platform may analyze information regarding transactions with merchants to provide users and/or merchants with information relevant to credit account acceptance. For example, users may be provided with information that enables the users to use credit accounts with one or more merchants, providing the users with additional payment options, opportunities for rewards, and/ or the like. Merchants may be provided with information that enables the merchants to determine demand for accepting credit account payments and provide additional payment options to the merchants' customers. In some implementations, the credit data platform may handle thousands, millions, billions, and/or the like, of data records regarding merchant transactions and/or other relevant credit account data within a period of time (e.g., daily, weekly, monthly), and thus may provide big data capability. The big data handled by the credit data platform may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for credit account analysis and recommendations conserves computing resources (e.g., processor resources, memory resources, and/or the like) and time that would otherwise be wasted by using manual processes for attempting to analyze credit account and transaction information, and developing and providing recommendations based on the analysis.

As indicated above, FIGS. 1A-1B are provided merely as examples. Other examples are possible and may differ from what was described with regard to FIGS. 1A-1B.

Figure 2:
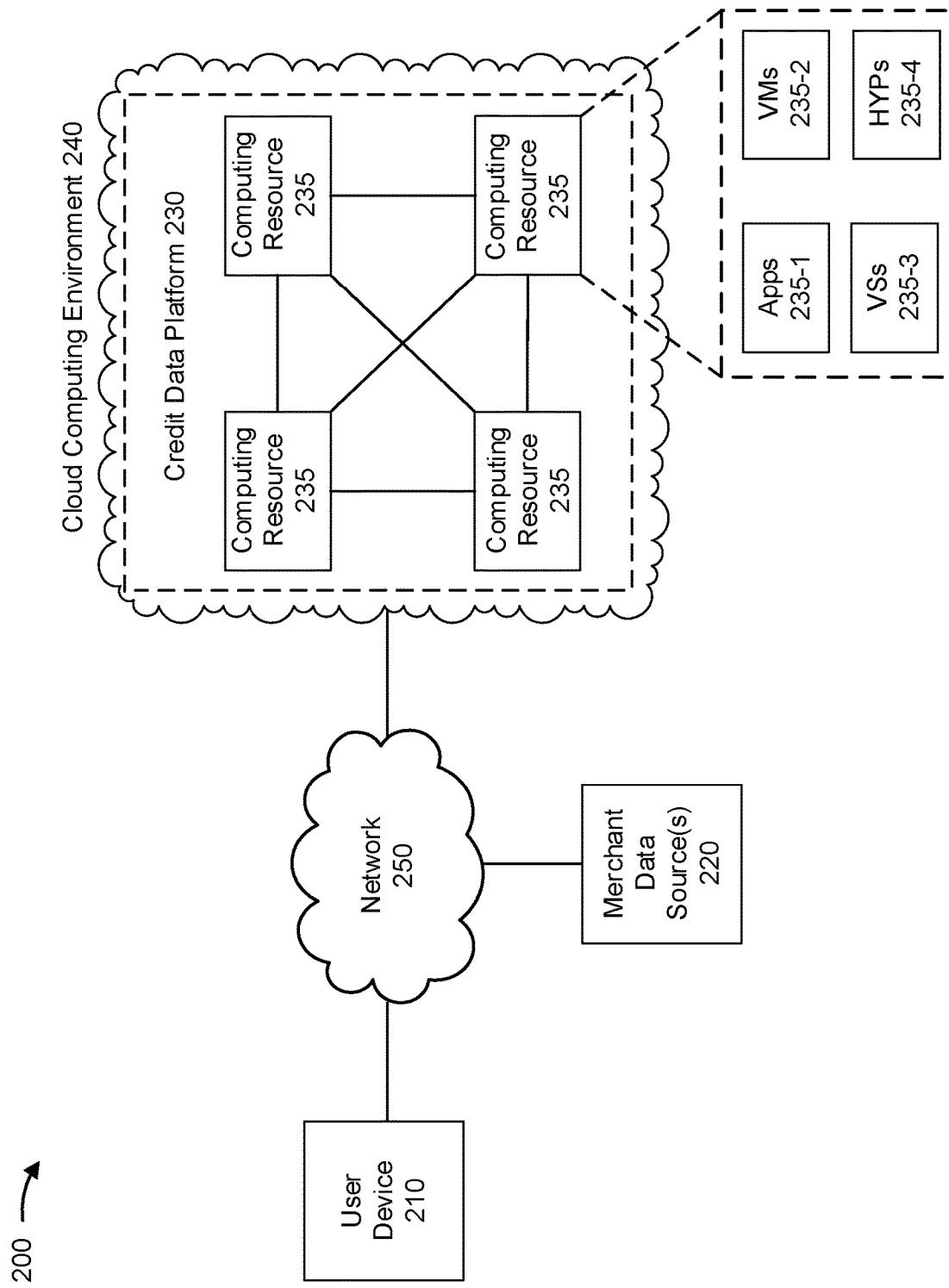
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a merchant data source 220, a credit data platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with merchant data, transaction data, and/or the like. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may be capable of communicating with merchant data sources 220 and/or credit data platform 230, for example, to provide transaction data regarding transactions with merchants, query for credit characteristics associated with merchants, and/or the like. In some implementations, user device 210 may include one or more applications designed to facilitate communications with merchant data source 220 and/or credit data platform 230, including one or more applications designed to receive instructions from the credit data platform that enable user device 210 to implement or otherwise act on various recommendations provided by credit data platform 230.

Merchant Data Source 220 includes one or more devices capable of receiving, generating, storing, processing, and/or providing information associated with merchants, transaction data, and/or the like. For example, merchant data source 220 may include a server device (e.g., a host server, a web server, an application server, etc.), a data center device, a storage device (e.g., one or more hard drives, random access memory (RAM), distributed storage devices, and/or the like), or a similar device. For example, merchant data source 220 may be capable of obtaining information related to a merchant or merchants from a variety of sources, aggregating the obtained information, and providing the information to credit data platform 230 for use in performing analysis and providing recommendations. While depicted separately from credit data platform 230, in some implementations, the functionality of merchant data source 220 may be included in credit data platform 230.

Credit data platform 230 includes one or more devices capable of receiving, generating, storing, processing, and/or providing information associated with merchants, user devices, transaction data, and/or the like. For example, credit data platform 230 may include a server device (e.g., a host server, a web server, an application server, etc.), a data center device, or a similar device. For example, credit data platform 230 may be capable of analyzing transaction data, and other information associated with merchants, to determine a variety of credit characteristics associate with the merchants. Based on the credit characteristics determined by credit data platform 230, credit data platform 230 may perform a variety of actions, including communicating with user device 210 regarding the recommendations that are based on the credit characteristics.

In some implementations, as shown, credit data platform 230 may be hosted in cloud computing environment 240. Notably, while implementations described herein describe credit data platform 230 as being hosted in cloud computing environment 240, in some implementations, credit data platform 230 might not be cloud-based (i.e., may be implemented outside of a cloud computing environment 240) or might be partially cloud-based.

Cloud computing environment 240 includes an environment that delivers computing as a service, whereby shared resources, services, etc. may be provided to user device 210 and/or credit data platform 230. Cloud computing environment 240 may provide computation, software, data access, storage, and/or other services that do not require end-user knowledge of a physical location and configuration of a system and/or a device that delivers the services. As shown, cloud computing environment 240 may include credit data platform 230 and computing resource 235.

Computing resource 235 includes one or more personal computers, workstation computers, server devices, or another type of computation and/or communication device. In some implementations, computing resource 235 may host credit data platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210 and/or credit data platform 230. Application 235-1 may eliminate a need to install and execute the software applications on user device 210. For example, application 235-1 may include software associated with credit data platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
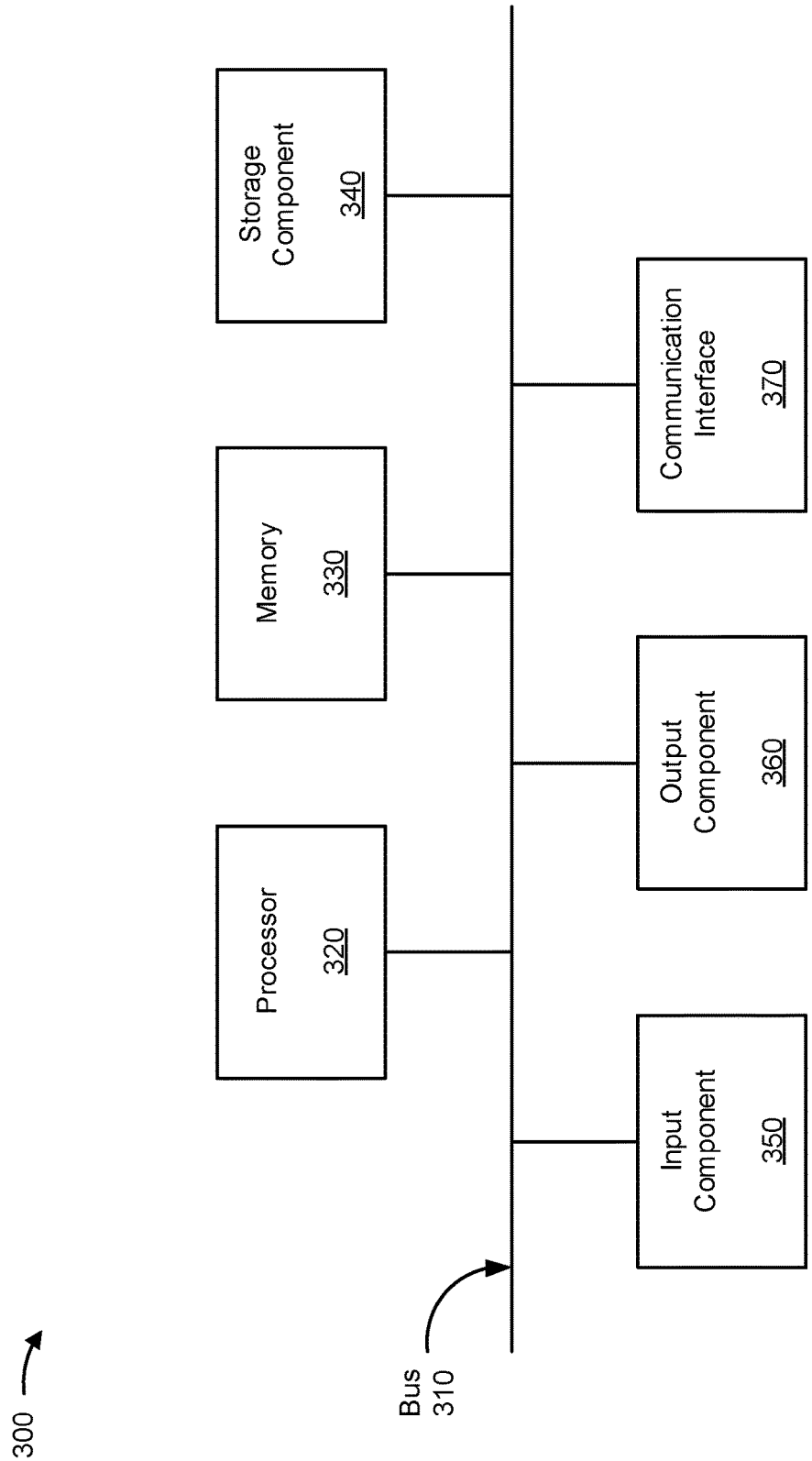
FIG. 3 is a diagram of example components of one or more devices of FIG. 2.

FIG. 3 is a diagram of example components of a device 300. Device 300 may correspond to user device 210, merchant data source 220, credit data platform 230, and/or computing resource 235. In some implementations, user device 210, merchant data source 220, credit data platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
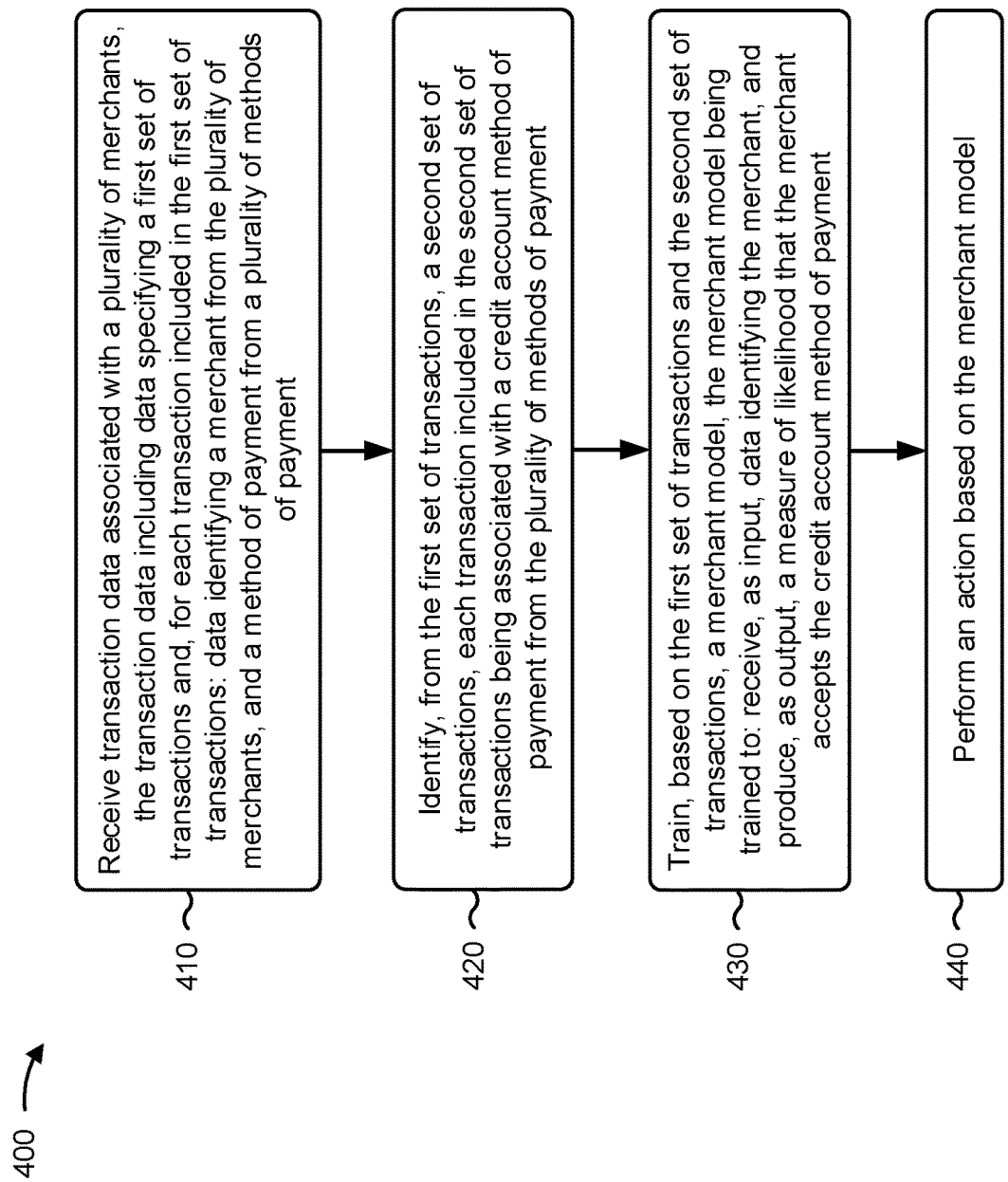

FIG. 4 is a flow chart of an example process 400 for credit account analysis and recommendations. In some implementations, one or more process blocks of FIG. 4 may be performed by a credit data platform (e.g. credit data platform 230). In some implementations, one or more process blocks of FIG. 4 may be performed by another device or a group of devices separate from or including the credit data platform, such as a user device (e.g. user device 210), a merchant data source (merchant data source(s) 220), and/or a computing resource (e.g. computing resource 235).

As shown in FIG. 4, process 400 may include receiving transaction data associated with a plurality of merchants, the transaction data including data specifying a first set of transactions and, for each transaction included in the first set of transactions: data identifying a merchant from the plurality of merchants, and a method of payment from a plurality of methods of payment (block 410). For example, the credit data platform (e.g., using computing resource 235, processor 320, memory 330, storage component 340, input component 350, communications interface 370, and/or the like) may receive transaction data associated with a plurality of merchants, the transaction data including data specifying a first set of transactions and, for each transaction included in the first set of transactions: data identifying a merchant from the plurality of merchants, and a method of payment from a plurality of methods of payment, as described above in connection with FIGS. 1A-1B.

As further shown in FIG. 4, process 400 may include identifying, from the first set of transactions, a second set of transactions, each transaction included in the second set of transactions being associated with a credit account method of payment from the plurality of methods of payment (block 420). For example, the credit data platform (e.g., using computing resource 235, processor 320, memory 330, storage component 340, and/or the like) may identify, from the first set of transactions, a second set of transactions, each transaction included in the second set of transactions being associated with a credit account method of payment from the plurality of methods of payment, as described above in connection with FIGS. 1A-1B.

As further shown in FIG. 4, process 400 may include training, based on the first set of transactions and the second set of transactions, a merchant model, the merchant model being trained to: receive, as input, data identifying the merchant, and produce, as output, a measure of likelihood that the merchant accepts the credit account method of payment (block 430). For example, the credit data platform (e.g., using computing resource 235, processor 320, memory 330, storage component 340, input component 350, output component 360, communications interface 370, and/or the like) may train, based on the first set of transactions and the second set of transactions, a merchant model, the merchant model being trained to: receive, as input, data identifying the merchant, and produce, as output, a measure of likelihood that the merchant accepts the credit account method of payment, as described above in connection with FIGS. 1A-1B.

As further shown in FIG. 4, process 400 may include performing an action based on the merchant model (block 440). For example, the credit data platform (e.g., using computing resource 235, processor 320, memory 330, storage component 340, input component 350, output component 360, communications interface 370, and/or the like) may perform an action based on the merchant model, as described above in connection with FIGS. 1A-1B.

Process 400 may include additional implementations, such as any single implementation or any combination of implementations described below and/or in connection with one or more other processes described elsewhere herein.

In some implementations, the transaction data may include data specifying a credit brand associated with transactions included in the second set of transactions; and the merchant model may be further trained to produce, as output, a measure of likelihood that the merchant accepts the credit account method of payment associated with the credit brand.

In some implementations, the transaction data may include data specifying a transaction amount associated with transactions included in the second set of transactions; and the merchant model may be further trained to produce, as output: a first limit indicating a minimum transaction amount for transactions associated with the credit account method of payment, and a second limit indicating a maximum transaction account for transactions associated with the credit account method of payment.

In some implementations, process 400 may further include storing, in a data structure and for a particular merchant of the plurality of merchants, data associating the particular merchant with data indicating the measure of likelihood that the particular merchant accepts the credit account method of payment.

In some implementations, process 400 may further include determining, based on the merchant model, that a particular merchant, of the plurality of merchants, accepts the credit account method of payment; identifying a user account associated with the particular merchant; and providing, to a user device associated with the user account, data indicating that the particular merchant accepts the credit account method of payment.

In some implementations, process 400 may further include determining, based on the merchant model, that a particular merchant, of the plurality of merchants, does not accept the credit account method of payment; and providing, to a merchant device associated with the particular merchant, data identifying at least one credit account acceptance option.

In some implementations, process 400 may further include determining, based on the transaction data and for the particular merchant, a measure of demand for the credit account method of payment; and providing, to the merchant device, data indicating the measure of demand for the credit account method of payment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
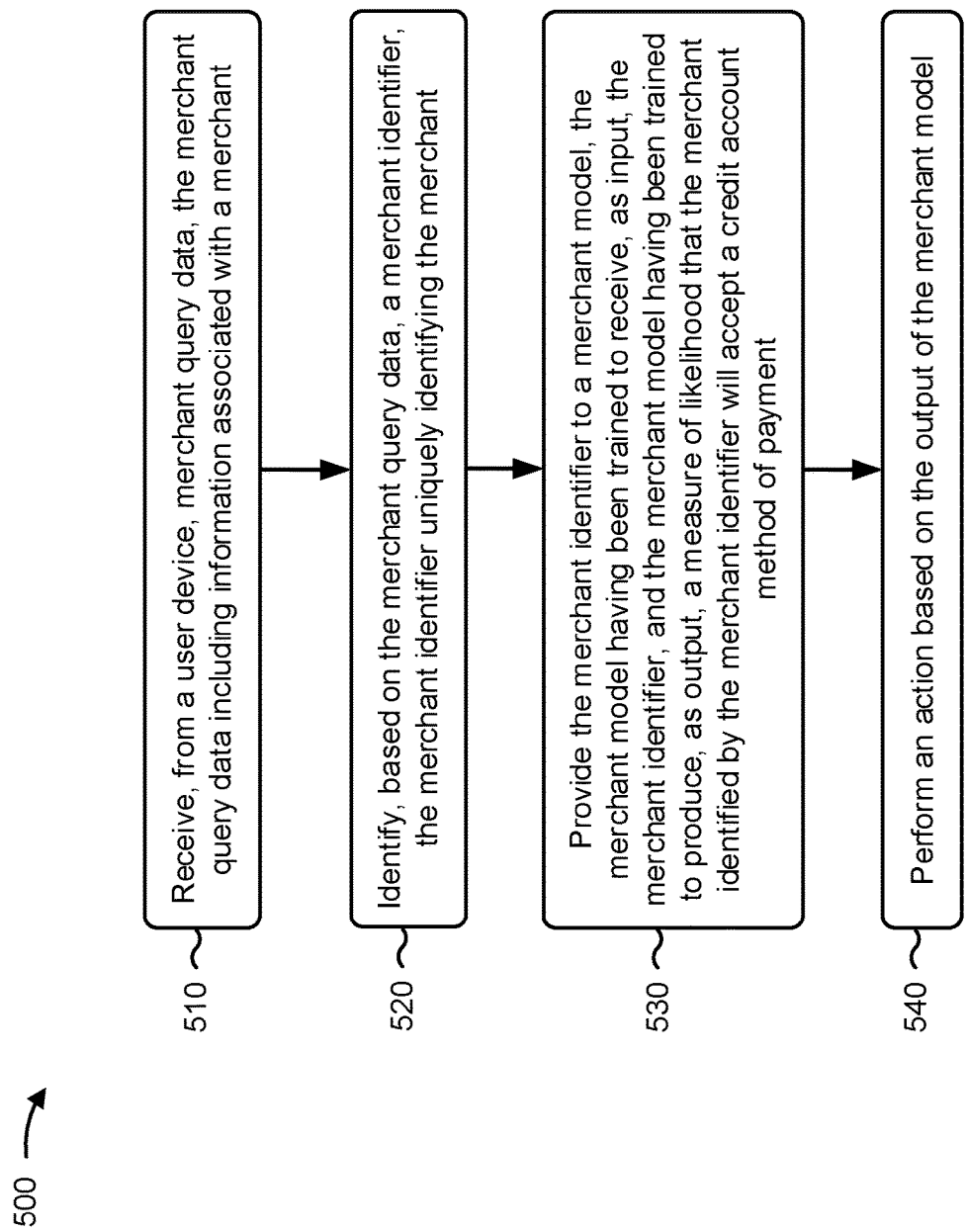

FIG. 5 is a flow chart of an example process 500 for credit account analysis and recommendations. In some implementations, one or more process blocks of FIG. 5 may be performed by a credit data platform (e.g. credit data platform 230). In some implementations, one or more process blocks of FIG. 5 may be performed by another device or a group of devices separate from or including the credit data platform, such as a user device (e.g. user device 210), a merchant data source (merchant data source(s) 220), and/or a computing resource (e.g. computing resource 235).

As shown in FIG. 5, process 500 may include receiving, from a user device, merchant query data, the merchant query data including information associated with a merchant (block 510). For example, the credit data platform (e.g., using computing resource 235, processor 320, memory 330, storage component 340, input component 350, communications interface 370, and/or the like) may receive, from a user device, merchant query data, the merchant query data including information associated with a merchant, as described above in connection with FIGS. 1A-1B.

As further shown in FIG. 5, process 500 may include identifying, based on the merchant query data, a merchant identifier, the merchant identifier uniquely identifying the merchant (block 520). For example, the credit data platform (e.g., using computing resource 235, processor 320, memory 330, storage component 340, input component 350, output component 360, communications interface 370, and/or the like) may identify, based on the merchant query data, a merchant identifier, the merchant identifier uniquely identifying the merchant, as described above in connection with FIGS. 1A-1B.

As further shown in FIG. 5, process 500 may include providing the merchant identifier to a merchant model, the merchant model having been trained to receive, as input, the merchant identifier, and the merchant model having been trained to produce, as output, a measure of likelihood that the merchant identified by the merchant identifier will accept a credit account method of payment (block 530). For example, the credit data platform (e.g., using computing resource 235, processor 320, memory 330, storage component 340, output component 360, communications interface 370, and/or the like) may provide the merchant identifier to a merchant model, the merchant model having been trained to receive, as input, the merchant identifier, and the merchant model having been trained to produce, as output, a measure of likelihood that the merchant identified by the merchant identifier will accept a credit account method of payment, as described above in connection with FIGS. 1A-1B.

As further shown in FIG. 5, process 500 may include performing an action based on the output of the merchant model (block 540). For example, the credit data platform (e.g., using computing resource 235, processor 320, memory 330, storage component 340, input component 350, communications interface 370, and/or the like) may perform an action based on the output of the merchant model, as described above in connection with FIGS. 1A-1B.

Process 500 may include additional implementations, such as any single implementation or any combination of implementations described below and/or in connection with one or more other processes described elsewhere herein.

In some implementations, the merchant query data may include transaction data associated with a transaction conducted with the merchant. In some implementations, the merchant query data may include data specifying a type of merchant, and the merchant is associated with the type of merchant.

In some implementations, when performing the action based on the output, process 500 may further include providing, to the user device, data indicating that the merchant accepts the credit account method of payment.

In some implementations, the merchant model further may produce, as output, data indicating at least one credit brand likely to be accepted by the merchant, and when performing the action based on the output of the merchant model, process 500 may further include identifying a plurality of credit brands associated with a user account associated with the user device; determining an amount of rewards associated with each of the plurality of credit brands associated with the user account; determining, from the plurality of credit brands and based on the amount of rewards, a recommended credit brand; and providing, to the user device, data indicating the recommended credit brand for use with transactions associated with the merchant.

In some implementations, the merchant model may further produce, as output, data indicating a first credit limit and a second credit limit associated with the merchant, and when performing the action based on the output of the merchant model, process 500 may further include providing, to the user device, data indicating the first credit limit and the second credit limit associated with the merchant.

In some implementations, when performing the action based on the output of the merchant model, process 500 may further include determining that the measure of likelihood that the merchant identified by the merchant identifier will accept the credit account method of payment does not meet a threshold measure of likelihood; and providing, to a merchant device associated with the merchant, data indicating that a user searched for credit account information associated with the merchant.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for credit account analysis and recommendations. In some implementations, one or more process blocks of FIG. 6 may be performed by a credit data platform (e.g. credit data platform 230). In some implementations, one or more process blocks of FIG. 6 may be performed by another device or a group of devices separate from or including the credit data platform, such as a user device (e.g. user device 210), a merchant data source (merchant data source(s) 220), and/or a computing resource (e.g. computing resource 235).

As shown in FIG. 6, process 600 may include receiving, from a first device, transaction data associated with a merchant (block 610). For example, the credit data platform (e.g., using computing resource 235, processor 320, memory 330, storage component 340, input component 350, communications interface 370, and/or the like) may receive, from a first device, transaction data associated with a merchant, as described above in connection with FIGS. 1A-1B.

As further shown in FIG. 6, process 600 may include identifying, based on the transaction data, credit account information associated with the merchant (block 620). For example, the credit data platform (e.g., using computing resource 235, processor 320, memory 330, storage component 340, input component 350, output component 360, communications interface 370, and/or the like) may identify, based on the transaction data, credit account information associated with the merchant, as described above in connection with FIGS. 1A-1B.

As further shown in FIG. 6, process 600 may include identifying a user identifier associated with the transaction data (block 630). For example, the credit data platform (e.g., using computing resource 235, processor 320, memory 330, storage component 340, input component 350, output component 360, communications interface 370, and/or the like) may identify a user identifier associated with the transaction data, as described above in connection with FIGS. 1A-1B.

As further shown in FIG. 6, process 600 may include identifying a credit account associated with the user identifier (block 640). For example, the credit data platform (e.g., using computing resource 235, processor 320, memory 330, storage component 340, input component 350, output component 360, communications interface 370, and/or the like) may identify a credit account associated with the user identifier, as described above in connection with FIGS. 1A-1B.

As further shown in FIG. 6, process 600 may include determining, based on the credit account information associated with the merchant, whether the merchant will accept transactions using the credit account associated with the user identifier (block 650). For example, the credit data platform (e.g., using computing resource 235, processor 320, memory 330, storage component 340, and/or the like) may determine, based on the credit account information associated with the merchant, whether the merchant will accept transactions using the credit account associated with the user identifier, as described above in connection with FIGS. 1A-1B.

As further shown in FIG. 6, process 600 may include determining, based on the credit account information associated with the merchant, one or more credit characteristics associated with the merchant (block 660). For example, the credit data platform (e.g., using computing resource 235, processor 320, memory 330, storage component 340, and/or the like) may determine, based on the credit account information associated with the merchant, one or more credit characteristics associated with the merchant, as described above in connection with FIGS. 1A-1B.

As further shown in FIG. 6, process 600 may include providing, to a second device associated with the user identifier: data indicating that the merchant accepts the credit account associated with the user identifier, and data indicating the potential benefits associated with use of the credit account associated with the user identifier. (block 670). For example, the credit data platform (e.g., using computing resource 235, processor 320, memory 330, storage component 340, output component 360, communications interface 370, and/or the like) may provide, to a second device associated with the user identifier: data indicating that the merchant accepts the credit account associated with the user identifier, and data indicating the potential benefits associated with use of the credit account associated with the user identifier, as described above in connection with FIGS. 1A-1B.

Process 600 may include additional implementations, such as any single implementation or any combination of implementations described below and/or in connection with one or more other processes described elsewhere herein.

In some implementations, the one or more credit characteristics may include at least one of: a fee associated with use of the credit account for transactions with the merchant, a minimum limit for credit account transactions with the merchant, or a maximum limit for credit account transactions with the merchant.

In some implementations, the potential benefits associated with use of the credit account associated with the user identifier may include at least one of: data identifying a rewards type associated with the credit account, or data identifying an amount of rewards associated with the credit account.

In some implementations, the credit account information may include a measure of likelihood that the merchant accepts a credit account method of payment from the credit account associated with the user identifier, the measure of likelihood that the merchant accepts the credit account method of payment being based on previous transactions associated with the merchant.

In some implementations, when identifying credit account information associated with the merchant, process 600 may further include identifying credit account information associated with the merchant based on the transaction data matching a regular expression associated with the merchant.

In some implementations, process 600 may further include generating the regular expression based on transaction data for a plurality of previous transactions associated with the merchant.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Using processes similar to those described above, the credit data platform 230 may analyze information regarding transactions with merchants to provide users and/or merchants with information relevant to credit account acceptance. For example, users may be provided with information that enables the users to use credit accounts with one or more merchants, providing the users with additional payment options, opportunities for rewards, and/or the like. Merchants may be provided with information that enables the merchants to determine demand for accepting credit account payments and provide additional payment options to the merchants' customers. In some implementations, the credit data platform 230 may handle thousands, millions, billions, and/or the like, of data records regarding merchant transactions and/or other relevant credit account data within a period of time (e.g., daily, weekly, monthly), and thus may provide big data capability. The big data handled by the credit data platform 230 may be so voluminous and complex that traditional data processing applications cannot be used and/or that the big data cannot be processed objectively by a human actor. Furthermore, some implementations described herein use a rigorous, computerized process to perform tasks or roles that were not previously performed. In addition, automating the process for credit account analysis and recommendations conserves computing resources (e.g., processor resources, memory resources, and/or the like) and time that would otherwise be wasted by using manual processes for attempting to analyze credit account and transaction information, and developing and providing recommendations based on the analysis.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a first device and from a second device, transaction data associated with a merchant;
   identifying, by the first device and based on the transaction data, credit account information associated with the merchant;
   identifying, by the first device, a user identifier associated with the transaction data;
   identifying, by the first device, a credit account associated with the user identifier;
   determining, by the first device and based on the credit account information associated with the merchant, whether the merchant will accept transactions using the credit account associated with the user identifier;
   determining, by the first device and based on the credit account information associated with the merchant and using a merchant model, one or more credit characteristics associated with the merchant,
      wherein the merchant model is trained to determine credit characteristics associated with merchants;
   training, by the first device, the merchant model based on determining the one or more credit characteristics;
   determining, by the first device and based on the credit account associated with the user identifier and the one or more credit characteristics associated with the merchant, potential benefits associated with use of the credit account associated with the user identifier; and
   providing, by the first device and to a third device associated with the user identifier:
      data indicating that the merchant accepts the credit account associated with the user identifier, and
      data indicating the potential benefits associated with use of the credit account associated with the user identifier.

2. The method of claim 1, wherein the one or more credit characteristics include at least one of:
   a fee associated with use of the credit account associated with the user identifier for transactions with the merchant,
   a minimum limit for credit account transactions with the merchant, or
   a maximum limit for credit account transactions with the merchant.

3. The method of claim 1, wherein the potential benefits associated with use of the credit account associated with the user identifier include at least one of:
   data identifying a rewards type associated with the credit account associated with the user identifier, or
   data identifying an amount of rewards associated with the credit account associated with the user identifier.

4. The method of claim 1, wherein the credit account information includes a measure of likelihood that the merchant accepts a credit account method of payment from the credit account associated with the user identifier, the measure of likelihood that the merchant accepts the credit account method of payment being based on previous transactions associated with the merchant.

5. The method of claim 1, wherein identifying the credit account information associated with the merchant comprises:
   identifying the credit account information associated with the merchant based on the transaction data matching a regular expression associated with the merchant.

6. The method of claim 5, further comprising:
   generating the regular expression based on transaction data for a plurality of previous transactions associated with the merchant.

7. The method of claim 5, wherein determining, based on the credit account information associated with the merchant, whether the merchant will accept transactions using the credit account associated with the user identifier comprises:
   determining whether the merchant will accept transactions using the credit account associated with the user identifier based on the merchant model,
   the merchant model being trained to:
      receive, as input, data identifying the merchant, and
      produce, as output, a measure of likelihood that the merchant will accept transactions using the credit account associated with the user identifier.

8. A first device, comprising:
   one or more memories; and
   one or more processors communicatively coupled to the one or more memories, configured to:
      receive, from a second device, transaction data associated with a merchant;
      identify, based on the transaction data, credit account information associated with the merchant;
      identify a user identifier associated with the transaction data;
      identify a credit account associated with the user identifier;
      determine, based on the credit account information associated with the merchant, whether the merchant will accept transactions using the credit account associated with the user identifier;
      determine, based on the credit account information associated with the merchant and using a merchant model, one or more credit characteristics associated with the merchant,
         wherein the merchant model is trained to determine credit characteristics associated with merchants;
      train the merchant model based on determining the one or more credit characteristics;
      determine, based on the credit account associated with the user identifier and the one or more credit characteristics associated with the merchant, potential benefits associated with use of the credit account associated with the user identifier; and
      provide, to a third device associated with the user identifier:
         data indicating that the merchant accepts the credit account associated with the user identifier, and
         data indicating the potential benefits associated with use of the credit account associated with the user identifier.

9. The first device of claim 8, wherein the one or more credit characteristics include at least one of:
   a fee associated with use of the credit account associated with the user identifier for transactions with the merchant,
   a minimum limit for credit account transactions with the merchant, or
   a maximum limit for credit account transactions with the merchant.

10. The first device of claim 8, wherein the potential benefits associated with use of the credit account associated with the user identifier include at least one of:
    data identifying a rewards type associated with the credit account associated with the user identifier, or
    data identifying an amount of rewards associated with the credit account associated with the user identifier.

11. The first device of claim 8, wherein the credit account information includes a measure of likelihood that the merchant accepts a credit account method of payment from the credit account associated with the user identifier,
    the measure of likelihood that the merchant accepts the credit account method of payment being based on previous transactions associated with the merchant.

12. The first device of claim 8, wherein the one or more processors, when identifying the credit account information associated with the merchant, are configured to:
    identify the credit account information associated with the merchant based on the transaction data matching a regular expression associated with the merchant.

13. The first device of claim 12, wherein the one or more processors are further configured to:
    generate the regular expression based on transaction data for a plurality of previous transactions associated with the merchant.

14. The first device of claim 12, wherein the one or more processors, when determining, based on the credit account information associated with the merchant, whether the merchant will accept transactions using the credit account associated with the user identifier, are configured to:
    determine whether the merchant will accept transactions using the credit account associated with the user identifier based on the merchant model,
    the merchant model being trained to:
       receive, as input, data identifying the merchant, and
       produce, as output, a measure of likelihood that the merchant will accept transactions using the credit account associated with the user identifier.

15. A non-transitory computer-readable medium storing instructions, the instructions comprising:
    one or more instructions that, when executed by one or more processors of a first device, cause the one or more processors to:
       receive, from a second device, transaction data associated with a merchant;
       identify, based on the transaction data, credit account information associated with the merchant;
       identify a user identifier associated with the transaction data;
       identify a credit account associated with the user identifier;
       determine, based on the credit account information associated with the merchant, whether the merchant will accept transactions using the credit account associated with the user identifier;
       determine, based on the credit account information associated with the merchant and using a merchant model, one or more credit characteristics associated with the merchant,
          wherein the merchant model is trained to determine credit characteristics associated with merchants;
       train the merchant model based on determining the one or more credit characteristics;

determine, based on the credit account associated with the user identifier and the one or more credit characteristics associated with the merchant, potential benefits associated with use of the credit account associated with the user identifier; and provide, to a third device associated with the user identifier:

data indicating that the merchant accepts the credit account associated with the user identifier, and data indicating the potential benefits associated with use of the credit account associated with the user identifier.

16. The non-transitory computer-readable medium of claim 15, wherein the one or more credit characteristics include at least one of:

a fee associated with use of the credit account associated with the user identifier for transactions with the merchant, a minimum limit for credit account transactions with the merchant, or a maximum limit for credit account transactions with the merchant.

17. The non-transitory computer-readable medium of claim 15, wherein the potential benefits associated with use of the credit account associated with the user identifier include at least one of:

data identifying a rewards type associated with the credit account associated with the user identifier, or data identifying an amount of rewards associated with the credit account associated with the user identifier.

18. The non-transitory computer-readable medium of claim 15, wherein the credit account information includes a measure of likelihood that the merchant accepts a credit account method of payment from the credit account associated with the user identifier, the measure of likelihood that the merchant accepts the credit account method of payment being based on previous transactions associated with the merchant.

19. The non-transitory computer-readable medium of claim 15, wherein the one or more instructions, that cause the one or more processors to identify the credit account information associated with the merchant, cause the one or more processors to:

identify the credit account information associated with the merchant based on the transaction data matching a regular expression associated with the merchant.

20. The non-transitory computer-readable medium of claim 19, wherein the one or more instructions, when executed by the one or more processors, further cause the one or more processors to:

generate the regular expression based on transaction data for a plurality of previous transactions associated with the merchant.

* * * * *